United States Patent
Kateley

[19]

[11] Patent Number: 5,810,512
[45] Date of Patent: Sep. 22, 1998

[54] METHOD AND APPARATUS FOR CONTAINMENT AND TREATMENT OF OIL AND OTHER POLLUTANTS

[76] Inventor: Richard D. Kateley, 113 Whispering Woods Hill, Guilford, Conn. 06437

[21] Appl. No.: 743,039

[22] Filed: Nov. 4, 1996

[51] Int. Cl.⁶ .................................................. E02B 15/04
[52] U.S. Cl. ............................. 405/64; 405/65; 405/68
[58] Field of Search .................................. 405/60, 62, 63, 405/64, 65, 66, 67, 68, 69, 70, 71, 72

[56] References Cited

U.S. PATENT DOCUMENTS

| | | | |
|---|---|---|---|
| 3,708,983 | 1/1973 | Brown et al. | 405/64 |
| 3,839,870 | 10/1974 | Ryan | 405/64 |
| 3,859,796 | 1/1975 | Benson | 405/64 |
| 5,152,242 | 10/1992 | Bradley | 405/64 X |
| 5,299,886 | 4/1994 | Whitaker | 405/63 X |
| 5,385,427 | 1/1995 | Kateley et al. | 405/63 X |

Primary Examiner—Tamara L. Graysay
Assistant Examiner—Frederick L. Lagman
Attorney, Agent, or Firm—Alfred E. Miller

[57] ABSTRACT

A marine containment boom for oil spillage body of water surrounding a cargo vessel at a dock in which the boom is selectively dropped to the sea bed by flooding the boom with an anti-freeze solution or is raised to the surface by pumping air into the boom, and further includes a pipe attached to the boom for discharging a fire retardant solution in the containment area and another and another pipe attached to the boom which functions to siphon oil spillage in the containment area to a holding tank.

5 Claims, 4 Drawing Sheets

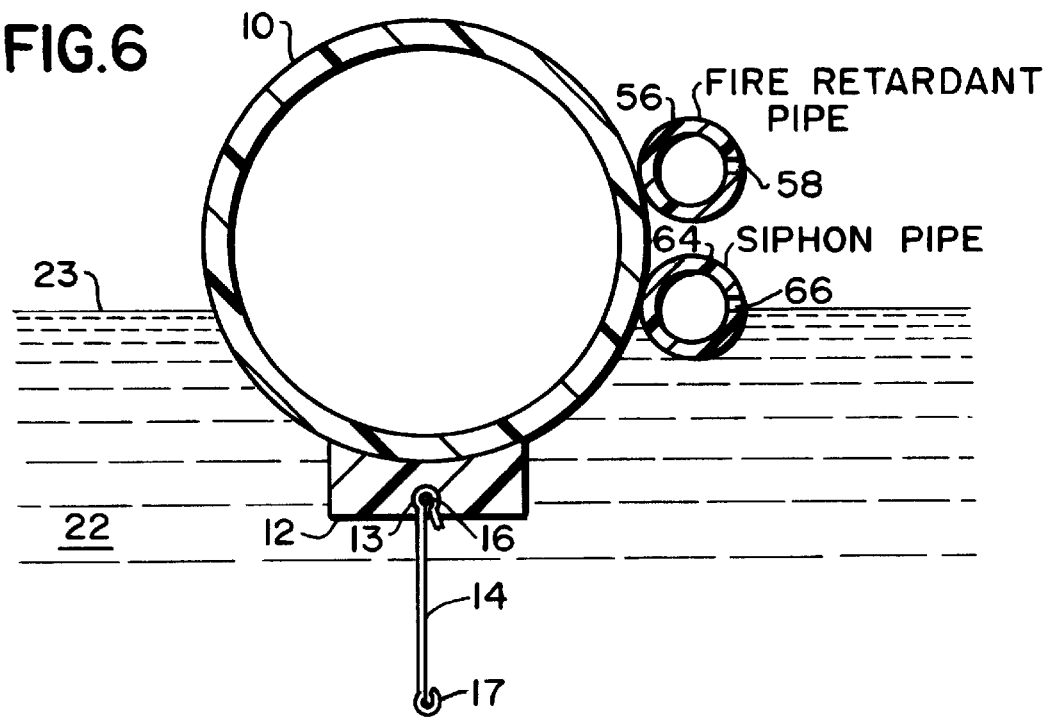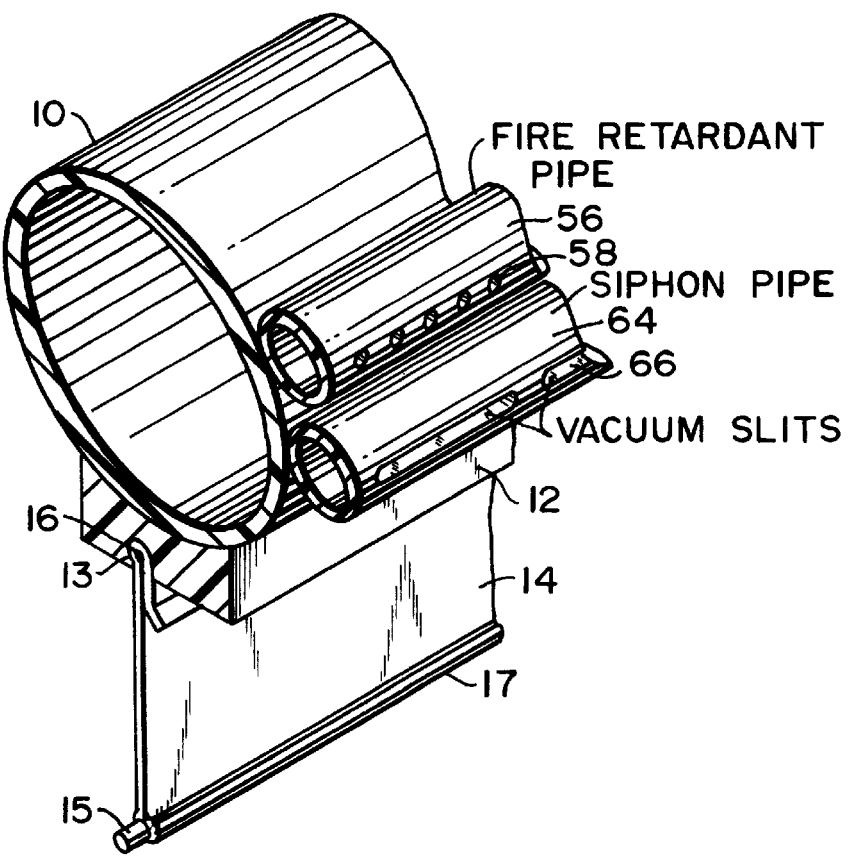

METHOD AND APPARATUS FOR CONTAINMENT AND TREATMENT OF OIL AND OTHER POLLUTANTS

This invention relates to an improved method for the containment and clean up of oil on water surrounding a moored vessel and includes a fire retardant system to prevent fires as a result of flammable materials on the water surrounding the moored vessel.

BACKGROUND OF THE INVENTION

As noted in U.S. Pat. No. 5,385,427 to Kateley et al., an apparatus is shown for surrounding a vessel such as a ship or barge that is moored by a dock and surrounded by a containment boom in order to contain the spillage from the vessel and prevent it from spreading further out into the water. Consequently, the task of cleanup in the event of spillage from a vessel is simplified.

In my previous U.S. Pat. No. 5,385,427 an arrangement is shown in which a boom is permanently anchored in position to surround a vessel to a terminal and is capable of being sunk to permit movement of the vessel away from the terminal or raised to serve as a containment boom. The boom is comprised at least partly of a length of semi-flexible plastic pipe such as polyethylene plastic pipe having a weighted skirt. Furthermore, the boom is permanently anchored, for example by means of stainless steel cable to anchors such as concrete blocks that lie at the bottom of the sea bed. The plastic pipe and surrounding portion of the skirt may have holes on the outboard side to permit the passage of a certain amount of air. In this embodiment of the invention, the boom was raised from the bottom of the harbor by pumping air into the pipe and is lowered by permitting sea water to flow though the holes into the pipe.

SUMMARY OF THE INVENTION

Although the containment boom shown in my patent simplified the task of deploying and retrieving a water born oil terminal containment boom, the present invention solves another problem that may arise in connection with the containment of an oil spill, and that is the possibility that the oil that is captured within the oil containment boom is subject to catching on fire and causing a conflagration of the whole area. In this connection, the present invention contemplates the use of a pipe just above the water level having a fire retardant foam therein which is connected to foam dispensers located on either the dock/terminal or the shore for supplying the fire retardant foam to the pipe.

The present invention also has a further feature of utilizing a non-toxic anti-freeze in the tanks which supply the piping in the boom thus reducing any chance of a freeze-up in the boom lines when the temperature falls below freezing. The lines and booms should be free flowing at all times.

A further feature of the present invention is a siphon pipe that is fixed to the side facing the dock or terminal and is provided with vacuum slits.

BRIEF DESCRIPTION OF THE DRAWINGS

In order that the invention may be more clearly understood, it will now be disclosed in greater detail with reference to the accompanying drawings, wherein:

FIG. 6 is a partial perspective view of the boom shown in FIG. 5 and showing the fire retardant pipe and siphon pipe in more detail and FIG. 7 is a partial perspective view of a portion of a boom showing the arrangement in more detail of the fire retardant pipe and the siphon pipe with vacuum slits.

DETAILED DISCLOSURE OF THE PREFERRED EMBODIMENT

Figure 1:
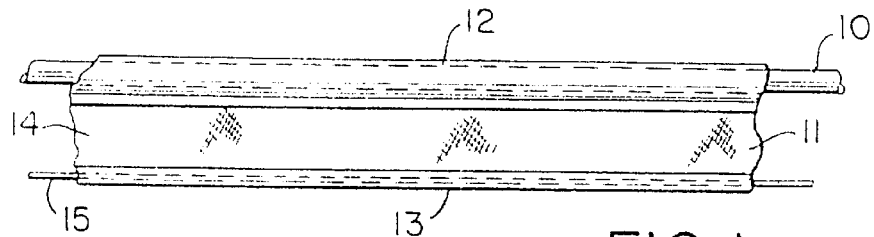
FIG. 1 is a proportion of the containment boom shown in the prior art.
Figure 2:
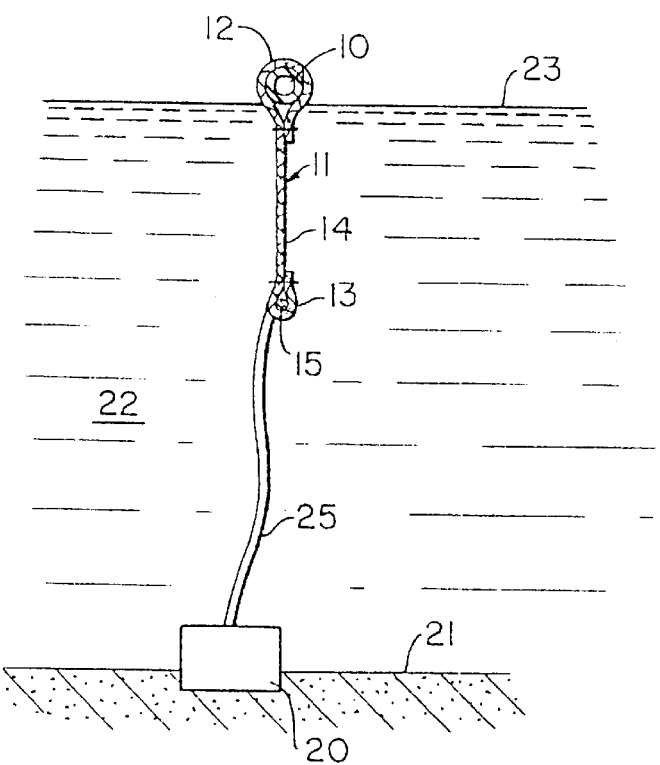
FIG. 2 is a cross-sectional view of the boom of FIG. 1.

Referring now to the drawings, and more in particular to FIGS. 1 and 2, a prior art containment boom is shown comprised of a continuous semi-flexible dredge pipe 10. The term "semi-flexible pipe", as used herein, refers to a pipe whose walls are sufficiently rigid that the cross sectional shape of the pipe is at least substantially maintained during use, whether filled with air or water, and that substantially maintains its longitudinal shape between positions at which it is anchored in the boom, even when subjected to wave action, but is still sufficiently flexible that it can bend flexibly sufficiently to enable it to be raised and lowered without damage. In other words, the material of the pipe can flexibly bend without damage from a fixed position on the shore or a pier to a position at which a portion thereof rests on the bottom of the body of water. It is not necessary for the material to be flexible enough for the portion of the pipe resting on the bottom of the body of water pipe to completely conform to the bottom of the body of water upon which it rests, as long as the portion thereof extending from this portion to the fixed position can flexibly bend sufficiently to avoid being damaged by raising and lowering of the boom. A material such as polyethylene has been found to be satisfactory for this purpose. The pipe 10 may have a diameter, for example, of 12 inches, although the invention is not limited to such dimension.

Figure 3:
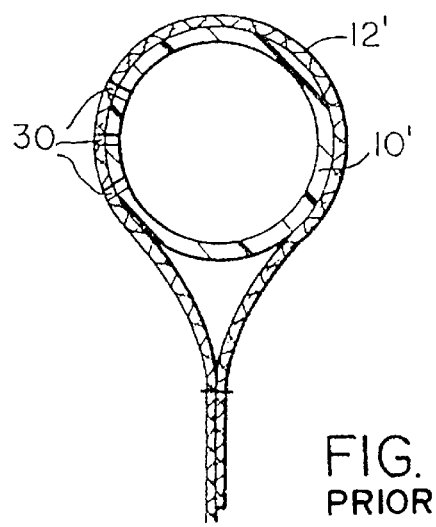
FIG. 3 is another large cross-sectional view of a portion of the boom in accordance with one embodiment of the invention.

As seen in FIGS. 1–3, a block 12, for example of polyethylene is affixed to the bottom of pipe 10, at least for a portion thereof that is intended to support a skirt 11. The skirt has a central web portion 14. The skirt 11, for example, is fabricated of a rip stop nylon. The block 12 has a central channel 13 extending longitudinally therein. The upper edge of the skirt 11 is fitted in the channel and held therein by rod 16, for example, a round stock key, snapped into the channel from the slot at the bottom edge thereof, thereby to lock the top of the skirt 11 in the block 12. The web portion 14 has a lower ballast sleeve 17 and a chain or wire ballast 15, for example of ¼ inch cable, extends continuously through the sleeve 13.

As illustrated in FIG. 2, a plurality of anchors 20 (only one of which is seen in FIG. 2), for example 500 pound blocks of concrete, rests on the bottom 21 of a body 22 of water, and the pipe 10, when in the buoyant condition, floats on the surface 23 of the body of water. The cable 15 of the boom is held to the anchor 20 by a stainless cable 25. The cable 25 may be a 1¼ stainless wire, although a different size cable may be employed. For example, a smaller diameter wire may be used, if desired, if there is a risk that the cable may become wrapped in the ship or tug wheel, the smaller diameter being capable of breaking to avoid damage to the vessel.

The number of anchors that are connected to the boom is dictated by the conditions of the application, such as the length of the boom, current conditions, etc. Shock cords may be coupled to the anchor lines, if desired in order to compensate for surges from the weather.

Figure 4:
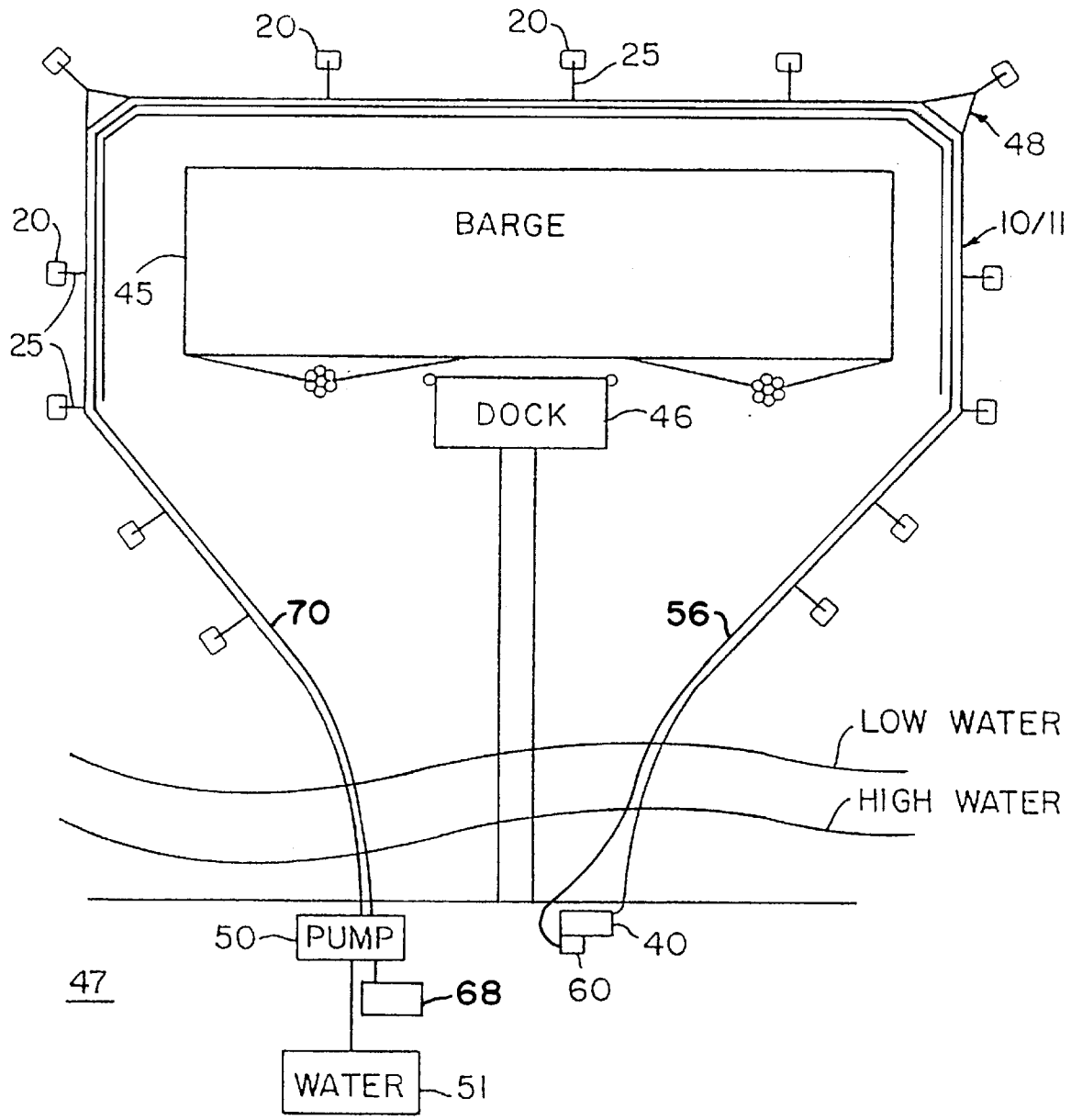
FIG. 4 is schematic illustration of the manner and the use of the boom shown in FIG. 3.

FIG. 4 illustrates the use of the boom of FIG. 3, as a containment boom surrounding a barge 45 moored at a dock or pier 46. The boom 10/11 is anchored to surround the barge 45, and be spaced therefrom by about 30–40 feet. The positions of the anchors 20 is selected to enable containing the largest vessel expected to moor at the dock. One end or both ends of the boom extends to the compressor 40, which may be located on a pier 46 or dry land 47. The positioning of the boom, for example at corners, may be simplified by the use of corner pendants 48, i.e. cable connected to a common anchor from several points on the boom.

In the use of the boom illustrated in FIG. 3, the compressor is initially turned off, and compressed air forces the anti-freeze solution into the boom and it sinks to sea floor. The vessel can now enter the dock area and moored, as illustrated in FIG. 4. After the vessel is moored, the compressor is turned on, to inflate the pipe 10. The pipe will become buoyant, and remain buoyant, as long as the compressor is energized. When the boom reaches the surface of the body of the water, it serves to contain any spillage from the vessel or dock.

When the loading or discharging process is finished, and the vessel is ready to depart, the compressor is secured to permit the air in the boom to be displaced by an anti-freeze solution causing the boom to sink to the water bottom.

Alternatively, the compressor 40 can be located on the pier 46. The boom may comprise a continuous loop surrounding the pier and vessel and have portions of semi-flexible pipe connected to the compressor 40 and the pump 50.

As illustrated in FIGS. 3 and 4 the pipe 10 is connected at one end to the compressor 40 and the other end is connected to a source of pressurized anti-freeze in tank 51 having a pump 50. In this embodiment of the invention the anti-freeze solution is pumped from the tank 51 to the boom pipe 10 when it is desired to sink the boom. Compressed air is pumped to the boom when it is desired to raise it. It is noted that the solution of anti-freeze has a greater specific gravity than the sea water and, consequently the boom pipe 10, when filled, will sink to the sea bed. It should be noted that use of anti-freeze in the boom pipe 10 permits the present system to be used in all types of weather including when the temperature drops below freezing.

In the arrangement shown in FIG. 4 one end of the pipe is connected to the compressor 40, and the other end is connected to a source of anti-freeze solution in tank 51 that is pressurized by pump 50. Thus, anti-freeze solution is pumped to the boom pipe 10 when it is desired to sink the boom to the bottom, or sea bed, and compressed air is pumped by the compressor 40 to the boom when it is desired to raise the boom to the water surface. It should be apparent that the compressor and anti-freeze pumps may be connected to enable the selective pumping of the anti-freeze to both ends of the pipe.

Figure 5:
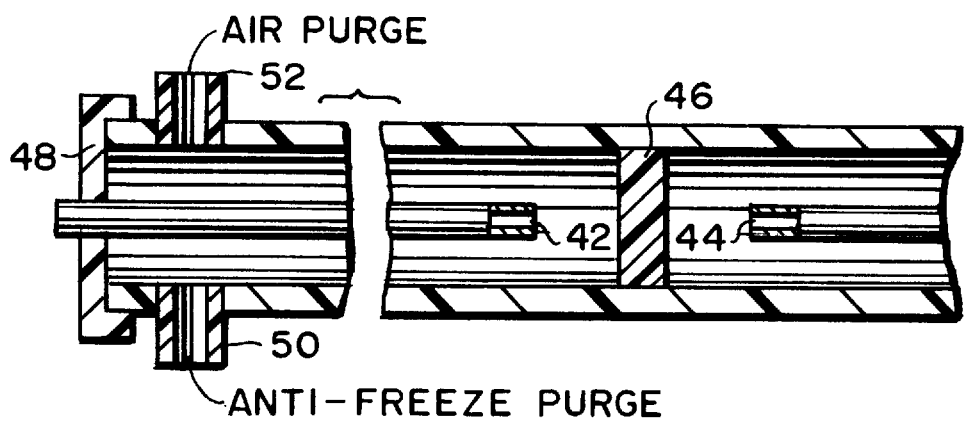
FIG. 5 is an enlarged partial cross-sectional view showing an arrangement enabling control of the position in which raising and lowering forces are initiated, as well as the air an purge pipes of the boom embodying the present invention.

Referring now to FIG. 5, the compressed anti-freeze solution intakes 42 and 44 are at opposite sides of the bulkhead portion 46 of the pipe 10. The boom pipe is provided with end cap 48 and adjacent to the end cap is an anti-freeze water purge valve 50 and an air purge valve 52. Thus, it should be evident when the boom is filled with anti-freeze and the boom commences to descend to the sea bed the air purge valve is open to permit air to escape from the boom. On the other hand, when it is desired to raise the boom 10 the valve 50 is open permitting the anti-freeze solution to be forced out by the compressed air that is pumped into the boom pipe 10 and returned through pipe line 54 to an anti-freeze receiving tank 51, as seen in FIG. 4 and located on either the dock or shore.

Referring now to FIGS. 6 and 7 wherein the boom pipe is provided with a fire retardant pipe welded or otherwise affixed to the side of the boom pipe facing the dock or terminal and, therefore, within the enclosed oil capture area. The fire retardant pipe 56 having spaced holes 58 is connected to the fire foam dispensing tank 60 which is provided with a suitable valve, such as a gate valve (not shown). The tank 60 is under pressure so that when the gate valve is opened the fire foam solution is dispensed through a series of holes 58 into the oil containment area, and thus prevents the ignition of floating oil and other contaminants on the surface of the water thereby preventing a conflagration on the water surface of the whole area surrounding the tanker at the dock or terminal. Located below the fire retardant pipe 54, and also welded or otherwise secured to the side of the boom, is a siphon pipe 64 provided with a series of vacuum slits 66. The siphon pipe is connected to a vacuum source 68. A vacuum is thus created in the siphon pipe 60 by said vacuum source 68, which may be a vacuum pump (not shown). Therefore, the siphon pipe 60 is positioned on the water level so that it draws in by suction the oil and any contaminants that drifts into the area adjacent to the pipe. This arrangement obviously assists in not only containing the oil spill, but evacuating the oil to a holding tank (not shown).

Since the pipe construction shown in FIG. 3 is solid and not perforated, it avoids the building up of marine growth in a pipe having a series of holes, and consequently avoids the eventual plugging of the holes which prevents the expelling of air through the holes, and causes interference with the sinking of the boom to the sea bed. In addition, the siphon pipe used in conjunction with the boom aids in the evacuation of the oil spillage while use of fire retardant material in another pipe acts to prevent combustion of the oil present in the oil spillage.

While the invention has been disclosed and described with reference to a single embodiment it will be apparent that changes and modifications may be made therein and it is intended in the following claims to cover each such variation and modification as falls within the true spirit and scope of the present invention.

What is claimed is:

1. A semi-flexible marine containment boom for oil and other pollutants in a body of water at least partially surrounding a cargo vessel at a dock and adapted to selectively move from a first position on the surface of the water to a second position wherein at least a portion of said boom rests on the floor of the body of water, said boom comprising a length of pipe, a containment means supported by said pipe, said containment means including a skirt having a web provided with a continuous ballast at the free end of the web, at least one permanent anchor, a line for permanently coupling said anchor to said pipe, a source of compressed air flowing into said pipe to cause said boom to have a positive buoyancy, a holding tank for anti-freeze solution, means for supplying said anti-freeze solution from said holding tank to the boom for lowering said boom to said floor of the body of water in order to permit the containment boom to operate when the temperature in the vicinity of the boom falls below freezing, and cable means for connecting said skirt to said anchor.

2. A marine containment boom for flammable pollutants in a body of water enclosing an area at least partially surrounding a cargo vessel at a dock and adapted to selectively move from a fixed position wherein it extends continuously from the fixed position to have a portion of said boom resting on the floor of the body of water and to a second position wherein said portion of said boom floats on the surface of the body of water, said boom comprising a length of pipe, a containment means supported by said boom pipe, said containment means including a skirt having a web provided with a continuous ballast at the free end of the web, at least one permanent anchor, a line for permanently coupling said anchor to said pipe, a source of compressed air, means for directing air from said source of compressed air into said boom pipe to cause said boom to have a positive buoyancy, said boom pipe being at least partly of a semi-flexible material, cable means for connecting said skirt to said anchor, a holding tank for a fire retardant solution and a second pipe of smaller cross section than said boom pipe facing said dock and said second pipe having spaced holes therein and affixed to said boom pipe, said solution being discharged from said holding tank through said holes in said second pipe and into said area within said containment boom when combustion occurs within said containment boom.

3. The combination as claimed in claim 2 wherein said second pipe is affixed to said boom pipe by welding.

4. A semi-flexible marine containment boom for oil and other pollutants in a body of water at least partially surrounding a cargo vessel at a dock and adapted to selectively move from a first position on the surface of the water to a second position wherein at least a portion of said boom rests on the floor of the body of water, said boom comprising a length of pipe, a containment means supported by said pipe, said containment means including a skirt having a web provided with a continuous ballast at the free end of the web, at least one permanent anchor, a line for permanently coupling said anchor to said pipe, a source of compressed air flowing into said pipe to cause said boom to have a positive buoyancy, cable means for connecting said skirt to said anchor, a holding tank for accumulating oil or other pollutants, a siphon pipe of smaller cross-section than said boom pipe and secured to the side of said boom pipe facing said dock, said siphon pipe having spaced openings positioned at the water level, and a vacuum source for creating a vacuum in said siphon pipe for drawing the oil or other pollutants into said holding tank.

5. The combination as claimed in claim 4 wherein said siphon pipe is affixed to said boom pipe by welding.

\* \* \* \* \*